Figure 1:
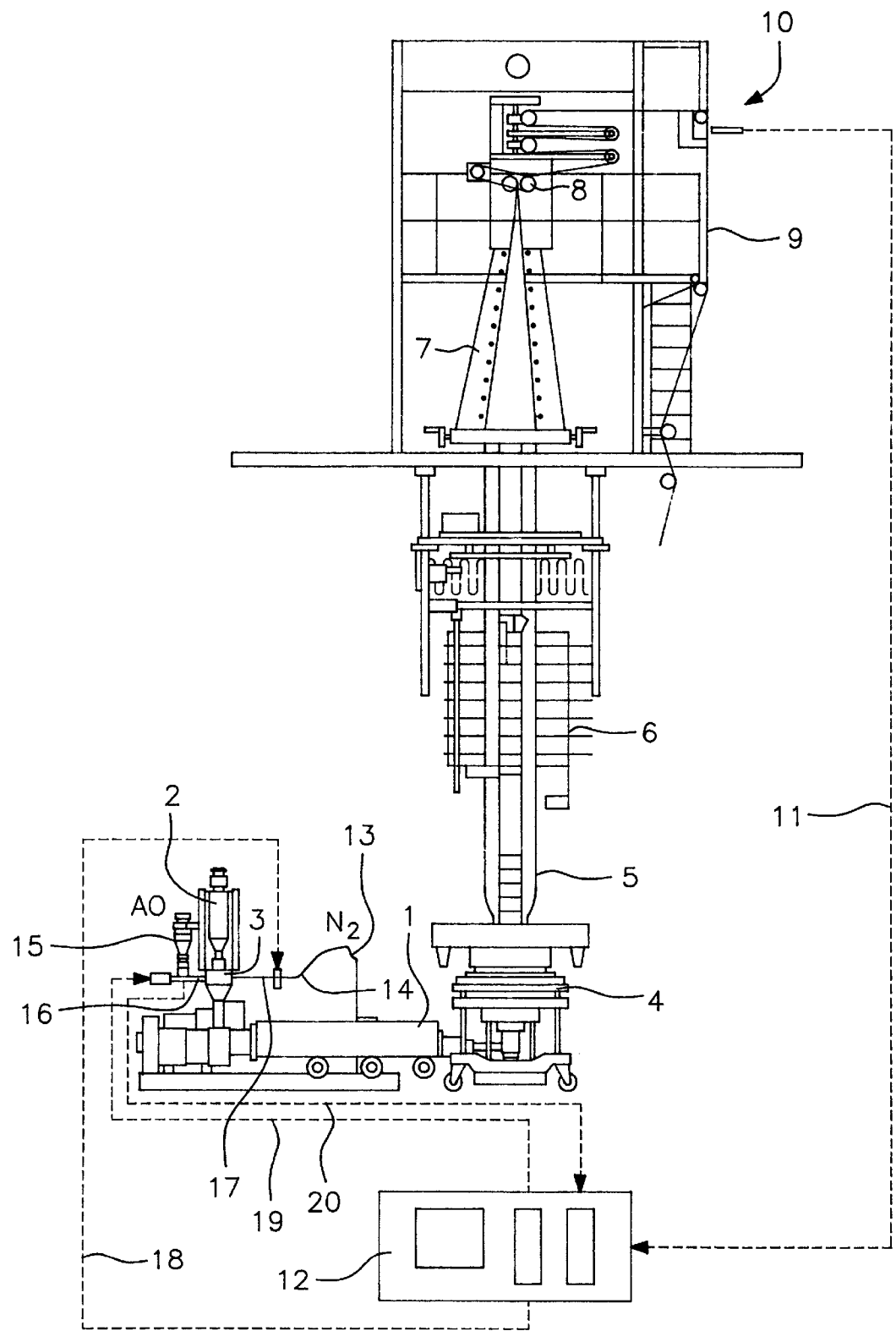

United States Patent [19]
Feistkorn

[11] Patent Number: 6,146,561
[45] Date of Patent: Nov. 14, 2000

[54] PROCESS FOR THE PREVENTION OF SOCALLED FISH EYES IN PLASTIC FILMS MANUFACTURED ACCORDING TO THE CASTING PROCESS OR ACCORDING TO THE BLOWN FILM PROCESS

[75] Inventor: Werner Feistkorn, Saerbeck, Germany

[73] Assignee: Windmöller & Hölscher, Lengerich, Germany

[21] Appl. No.: 09/116,902

[22] Filed: Jul. 17, 1998

[30] Foreign Application Priority Data

Jul. 17, 1997 [DE] Germany .......................... 197 30 757

[51] Int. Cl.$^7$ ....................................................... B29C 7/04

[52] U.S. Cl. .......................... 264/40.1; 264/85; 264/565; 425/135

[58] Field of Search ........................... 264/40.1, 85, 565; 425/209.1, 135, 136, 145

[56] References Cited

PUBLICATIONS

Chemical Process Control, Intro. to Theory and Practice, G. Stephanopoulos, Prentice Hall, Inc., pp. 2–11, 1984.
Plastics Extrusion Technology, 2nd Ed., A. Griff, Reihold Book Corp., pp. 152–155, Nov. 1985.
Plastics Extrusion Technology Handbook, S. Levy and J. F. Carley, eds., Industrial Press, Inc. pp. 267–307, Sep. 1993.

*Primary Examiner*—Jan H. Silbaugh
*Assistant Examiner*—Mark Eashoo
*Attorney, Agent, or Firm*—Jacobson, Price, Holman & Stern, PLLC

[57] ABSTRACT

To prevent socalled fish eyes or to reduce the number of fish eyes per unit of area in plastic films, manufactured according to the casting process or according to the blown film process, the number of fish eyes per unit of area is measured in the tubular film, which is cast or blown or collapsed. When the measurement reveals a number of fish eyes per unit of area that exceed a specified value, nitrogen or antioxidants are blown or put into the hopper until the number of fish eyes per unit of area falls below a critical number.

4 Claims, 1 Drawing Sheet

U.S. Patent   Nov. 14, 2000   6,146,561

PROCESS FOR THE PREVENTION OF SOCALLED FISH EYES IN PLASTIC FILMS MANUFACTURED ACCORDING TO THE CASTING PROCESS OR ACCORDING TO THE BLOWN FILM PROCESS

The invention relates to a process for the prevention of socalled fish eyes or for the reduction of the number of fish eyes per unit of area in plastic films, manufactured according to the casting process or according to the blown film process, by blowing nitrogen into the hopper of the extruder of the blown film line.

Plastic films, manufactured according to the blown film process, can have socalled fish eyes, which appear as granular dots or small circles in a film of otherwise uniform and constant transparency. These defective points, called fish eyes, are caused by inhomogeneity in the extruded polymer melt, where the dragging in of oxygen into the extruder causes or at least promotes said inhomogeneity. It is known to suppress or at least to reduce the creation of these fish eyes by blowing nitrogen into the hopper of the extruder. The continuous blowing of nitrogen into the hopper of the extruder requires, however, significant quantities of nitrogen, so that the constant gassing of the hopper with nitrogen results in relatively high costs.

Therefore, the object of the invention is to propose a process of the aforementioned type, which can be implemented economicly by economizing on the nitrogen.

The invention solves this problem associated with the process of the aforementioned type, in that the number of fish eyes per unit of area is measured in the tubular film, which is cast or blown or collapsed; and upon measuring a number of fish eyes per unit of area that exceed a specified value, nitrogen is blown into the hopper until the number of fish eyes per unit of area falls below a critical number.

The number of fish eyes per unit of area in the plastic film, manufactured according to the blown film process, can be measured simply with known fish eye meters, which can observe the width or a part of the width of the film and deliver measurement values, which are equivalent to the number of fish eyes per unit of area and which enable a statistical evaluation of the fish eye content. Furthermore, the invention is based on the knowledge that, after the fish eye content falls below a critical value or after complete elimination of the fish eyes, the introduction of nitrogen into the hopper of the extruder can be interrupted, without immediately generating again an undesired number of fish eyes. Thus, the result of the process according to the invention is a type of control of the maximum fish eye content by way of feeding, as needed, nitrogen to the hopper of the extruder, wherein the controlled variable is the number of fish eyes per unit of area and the manipulated variable is the quantity of added nitrogen.

The process of the invention can be carried out in a simple manner by using a computer (microcomputer), which, as a function of the measured number of fish eyes per unit of area of the extruded plastic film, controls a valve, which introduces nitrogen into the hopper of an extruder by way of a line from the source of nitrogen.

According to another embodiment of the invention, instead of nitrogen to suppress the formation of fish eyes, another oxygen-preventing or displacing gas and/or antioxidants in the form of powders or granules can also be put into the hopper.

The process of the invention can also be carried out in such a manner that to suppress the formation of fish eyes not only nitrogen but also antioxidants in the form of powders or granules can also be put into the hopper.

One embodiment of the invention is explained in detail in the following with reference to the drawing, whose single FIGURE is a schematic of a blown film line with a control circuit controlling the fish eye content.

Polymer granules are fed into an extruder 1 by way of a silo or intermediate vessel 2 and a hopper 3. The polymer melt, which is melted and homogenized in the extruder 1, is fed to the blown film die 4; and issuing from the annular nozzle of the blown film die in the form of a film tube, is blown up into a tubular film bubble 5 by means of internal air, which is under excess pressure and introduced as internal cooling air by way of the feed and drain lines, penetrating the blown film die. The tubular film bubble 5, whose diameter is calibrated by means of calibrating units 6, is then collapsed by means of the collapsing boards 7 and drawn off in the collapsed form by means of the pinch rolls 8. The collapsed web of tubular film is then guided over guide rollers and deflecting rods to a winding unit (not illustrated), in which it is wound up into a roll of tubular film. This method of producing webs of tubular film is known and, therefore, does not have to be described in detail.

Prior to being wound up into a roll of film, the web of tubular film 9, which is collapsed and pulled from the tubular film bubble 5, passes a fish eye meter 10, which measures by the known method the fish eye content, thus the number of fish eyes per unit of area. The values, measured by the fish eye meter 10, are fed in the form of measurement pulses to the computer 12 by way of the line 11, shown as a dashed line. A nitrogen ($N_2$) storing bottle 13 is connected to the hopper 3 of the extruder 1 by means of a line 14, and/or a storage container 15, storing an antioxidant, is connected to said hopper by way of a screw conveyor 16. A controllable solenoid valve 17 is arranged in the nitrogen feed line 14. When the fish eye sensor 10 measures a number of fish eyes per unit of area that exceed a critical value, the computer 12 drives in such a manner the solenoid valve 17 and/or the controllable motor of the feed worm 16 by way of the lines 18, 19, that a predetermined quantity of nitrogen and/or antioxidant is fed to the hopper. The computer 12 receives via the line 20 an acknowledged message about the worm speed, thus the quantity of added antioxidant.

When the fish eye sensor reports to the computer 12 that the fish eye content has dropped below a critical value, the feed of nitrogen and/or antioxidant is interrupted or decreased.

What is claimed is:

1. A process for prevention or reduction of a number of fish eyes per unit of area in tubular plastic films caused by introduction of oxygen, by blowing nitrogen into a hopper for raw materials of a film line, said process comprising:

measuring the number of fish eyes per unit of area in the tubular plastic film; and upon measuring the number of fish eyes per unit of area that exceed a specified value, blowing nitrogen into the hopper;

continuing the blowing of nitrogen into the hopper until the number of measured fish eyes per unit of area falls below a critical number; and then interrupting the blowing of nitrogen into the hopper.

2. The process, as claimed in claim 1, wherein to suppress formation of fish eyes, not only nitrogen but also antioxidants in the form of powders or granules are fed into the hopper to reduce or eliminate the presence of oxygen.

3. A process for prevention or reduction of a number of fish eyes per unit of area in plastic films caused by introduction of oxygen, said process comprising:

measuring the number of fish eyes per unit of area in the plastic film;

upon measuring a number of fish eyes per unit of area that exceed a specified value, introducing antioxidants in the form of powders or granules into a hopper for the raw materials of the plastic film to reduce or eliminate the presence of oxygen;

continuing the introduction of antioxidants into the hopper until the number of measured fish eyes per unit of area falls below a critical number; and then interrupting the introduction of antioxidants into the hopper.

4. A process for prevention or reduction of a number of fish eyes per unit of area in plastic films caused by introduction of oxygen, said process comprising:

measuring the number of fish eyes per unit of area in the plastic film;

upon measuring a number of fish eyes per unit of area that exceed a specified value, introducing an oxygen displacing gas into a hopper for the raw materials of the plastic film to eliminate or reduce the presence of oxygen;

continuing the introduction of oxygen displacing gas into the hopper until the number of fish eyes per unit of area falls below a critical number; and then interrupting the introduction of oxygen displacing gas into the hopper.

* * * * *